United States Patent
Enstrom et al.

(10) Patent No.: US 8,451,741 B2
(45) Date of Patent: May 28, 2013

(54) JITTER-BASED MEDIA LAYER ADAPTATION IN REAL-TIME COMMUNICATION SYSTEMS

(75) Inventors: Daniel Enstrom, Gammelstad (SE); Tomas Frankkila, Luleå (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 754 days.

(21) Appl. No.: 12/600,084

(22) PCT Filed: May 30, 2007

(86) PCT No.: PCT/SE2007/000526
§ 371 (c)(1),
(2), (4) Date: Nov. 13, 2009

(87) PCT Pub. No.: WO2008/147255
PCT Pub. Date: Dec. 4, 2008

(65) Prior Publication Data
US 2010/0220615 A1   Sep. 2, 2010

(51) Int. Cl.
*G01R 31/08*   (2006.01)

(52) U.S. Cl.
USPC ............................ 370/252; 370/235; 370/516

(58) Field of Classification Search
None
See application file for complete search history.

(56) References Cited

U.S. PATENT DOCUMENTS

| | | | |
|---|---|---|---|
| 7,542,422 B2 * | 6/2009 | Joyce et al. | 370/235 |
| 2005/0249115 A1 * | 11/2005 | Toda et al. | 370/229 |
| 2007/0064604 A1 * | 3/2007 | Chen et al. | 370/230 |

OTHER PUBLICATIONS

Busse I et al: "Dynamic QoS control of multimedia applications based on RTP" Computer Communications, Elsevier Science Publishers BV, Amsterdam, NL, vol. 19, No. 1, Jan. 1996, pp. 49-58.
Zhang Q et al: "End-to-End QoS for Video Delivery Over Wireless Interenet" Proceedings of the IEEE, IEEE. New York, US, vol. 93, No. 1, Jan. 2005, pp. 123-134.

* cited by examiner

Primary Examiner — Kibrom T Hailu

(57) ABSTRACT

It is a basic idea to determine the characteristics of a jitter profile measured over a plurality of packets, and classify the jitter profile based on the determined characteristics as well as information representative of the particular access used for communication between the sender and the receiver. The classified jitter profile is then matched to an appropriate action for media layer adaptation so that a proper action for media layer adaptation can be initiated.

21 Claims, 9 Drawing Sheets

| Access categories | | Types of jitter characteristics | Media adaptation action |
| --- | --- | --- | --- |
| Access type | Parameter settings | | |
| Type 1 | Setting 1 | Jitter type 1 | Action 1 |
|  |  | Jitter type 2 | Action 2 |
|  | Setting 2 | Jitter type 3 | Action 3 |
| Type 2 | Setting 1 | Jitter type 1 | Action 1 |
|  |  | Jitter type 2 | Action 2 |
|  | Setting 2 | Jitter type 1 | Action 1 |
|  |  | Jitter type 2 | Action 2 |
| Type 3 | Setting 1 | Jitter type 1 | Action 1 |
|  |  | Jitter type 2 | Action 2 |
|  | Setting 2 | Jitter type 1 | Action 1 |
|  |  | Jitter type 2 | Action 2 |

| Access categories | | Types of jitter characteristics | Media adaptation action |
|---|---|---|---|
| Access type | Parameter settings | | |
| WLAN | | 0-50, 0-100, 0-5 50-75, 0-100, 5- 75-, 100-, 5- | Normal Reduce packet size Increase redundancy |
| GSM | RAB 1 | 0-150 150- | Normal Reduce bit-rate |
| | RAB 2 | 0-100, 0-10 100-, 10- | Normal Reduce packet size |
| HSPA | RAB 1 (RLC-UM) | 0-150, 0-250, 0-15 150-, 250-, 15- | Normal Reduce packet size |
| | RAB 2 (RLC-AM) | 0-150, 0-250, 15- 150-, 250-, 30- | Normal Reduce bit rate |

*Fig. 5*

JITTER-BASED MEDIA LAYER ADAPTATION IN REAL-TIME COMMUNICATION SYSTEMS

TECHNICAL FIELD

The present invention generally relates to real-time communication, and more particularly to media layer adaptation.

BACKGROUND

In any real-time communication system, there is a need to adopt to a change in the transport characteristics. For example, for data transport based on the Internet Protocol (IP), this was seen already when designing the Real-Time Transport Protocol (RTP) [1] where an accompanying reporting protocol called the Real-time Transport Control Protocol (RTCP) was designed in order to enable point-to-point reporting of the experienced characteristics of the media flow. In an RTCP report, a number of different characteristics can be reported and there are provisions to use so-called extended RTCP reports (RTCP-XR) which can contain a very large amount of data. The receival of these reports makes it possible for the transmitting application/unit to change its behavior to make better use of the available channel resources.

When using a real-time communication service in an environment where the link throughput or the total end-to-end transport characteristics cannot be guaranteed, there will be a need for the application to cope with these varying circumstances. If this is not done, the session might be compromised with less than optimal quality or terminated in worst case. This is valid for all communication networks and even more so for mobile networks since the radio environment makes it virtually impossible to provide guarantees about the transport characteristics.

This is also true for circuit-switched transport. In the Adaptive Multi-Rate (AMR) speech codec used in 3GPP Circuit Switched (CS) speech services there are means to signal end-to-end requests for the codec to adapt to new measured circumstances. For example, when the Carrier-to-Interference ratio (C/I) of one of the radio links falls below a certain threshold, a request is normally sent using the Codec Mode Request (CMR) bits in the AMR bit-stream to the other end to reduce the source coding bit-rate and apply more robust channel coding.

For IP transport, RTCP can fulfill roughly the same purpose but it has a number of drawbacks, the main one being long delay between reports which forces the application to be reactive rather than proactive. The use of RTCP receiver reports will thus make the adaptation process rather slow. Even though the information in the reports is usable, any response to it will in practice be reactive rather than proactive. The quality degradation will already have occurred.

The problem of the slow response of RTCP reports has been recognized in reference [2], where a procedure based on audio packet loss prediction at the receiver is suggested. By predicting audio packet loss at the receiver side, the sender can be warned. In particular, the packet inter-arrival jitter is computed for each packet and compared to predefined thresholds to predict packet loss. It is envisaged that an abrupt change in inter-arrival time is followed by an overshoot in audio packet loss. In this way, by monitoring the inter-arrival jitter on a packet-by-packet basis it is possible to reduce packet loss by warning the sender as soon as the jitter exceeds a certain threshold value.

Although the solution described in reference [2] represents a considerable improvement compared to the slow RTCP report mechanism, the solution does not seem to provide quite satisfactory results in practical applications. In particular, the approach suggested in reference [2] seems to be much too conservative in many applications.

There is thus a general need for an improved mechanism for media layer adaptation in real-time applications.

SUMMARY

The present invention overcomes these and other drawbacks of the prior art arrangements.

It is a general object of the present invention to provide an efficient strategy for media layer adaptation for real-time communication. Efficient media layer adaptation naturally leads to efficient use of the available transport/channel resources.

It is an object of the invention to provide a media layer adaptation mechanism with a more direct response so as to obtain proactive rather than reactive adaptation. It would clearly be beneficial to provide a way of measuring channel degradation before the media layer consequences lead to severe quality problems.

In particular it is desirable to provide an improved jitter-based mechanism for avoiding packet loss that more optimally exploits the benefits of predicting packet loss at the receiver side.

It is also an object of the invention to provide a device for supporting media layer adaptation in a real-time communication system.

These and other objects are met by the invention as defined by the accompanying patent claims.

The inventors have recognized that a jitter profile for a specific access technology and/or access parameter setting might be normal and should not trigger any adaptive action while the same jitter profile for another access technology and/or access parameter setting necessitates immediate adaptive actions. Hence, instead of evaluating jitter on a packet-by-packet basis, an entire jitter profile over a plurality of packets should preferably be evaluated. Furthermore, it is important that the measured jitter profile is put into the correct context when it is evaluated. To base an adaptation control algorithm solely on measured jitter (and packet loss rate) will give some opportunities but it will also force a conservative control algorithm which has significant room for improvement.

A basic idea of the invention is therefore to determine characteristics of a jitter profile measured over a plurality of packets, and classify the jitter profile based on the determined characteristics as well as information representative of the particular access used for communication between the sender and the receiver. The classified jitter profile is then matched to an appropriate action for media layer adaptation so that the proper action can be initiated.

By making the classification of the jitter profile not only based on the determined jitter characteristics, but also based on information on the access used for the communication a much more informed media layer adaptation decision can be made, leading to considerable improvements of the utilization of available resources in the communication system.

Preferably, the access information includes information on the access configuration for the considered media packet flow and normally involves information on the access type and/or information on the access parameter setting. In a wireless application this may for example be information on the wireless access type used and/or information on the radio bearer setting.

Other aspects and advantages of the invention will be appreciated when reading the below description of embodiments of the invention.

BRIEF DESCRIPTION OF THE DRAWINGS

The invention, together with further objects and advantages thereof, will be best understood by reference to the following description taken together with the accompanying drawings, in which:

FIG. 4 is a schematic diagram illustrating the principles of database configuration according to an exemplary embodiment of the invention.

FIG. 5 is a schematic diagram illustrating an example of a database configuration according to an exemplary embodiment of the invention.

DETAILED DESCRIPTION OF EMBODIMENTS

Figure 1:
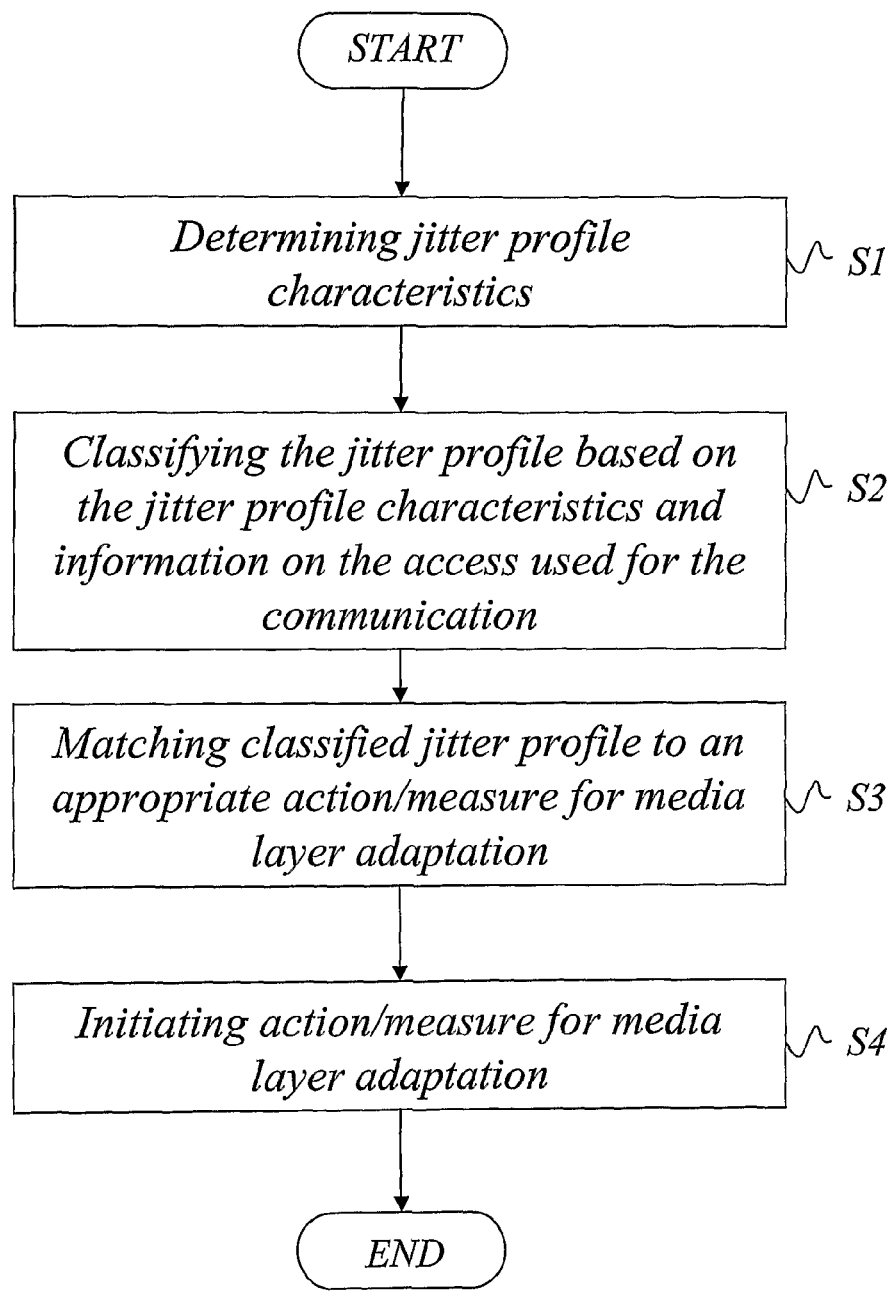
FIG. 1 is a schematic flow diagram of a method for media layer adaptation in a real-time communication system.

Throughout the drawings, the same reference characters will be used for corresponding or similar elements.

As previously discussed, in any real-time communication system there is a basic need to adopt to changes in the transport conditions. However, the prior art solutions suffer from several problems.

For example, for IP transport, the use of RTCP receiver reports will make the media layer adaptation process rather slow. Even though the information in the reports is usable, any response to it will in practice be reactive rather than proactive. The quality degradation will already have occurred.

In Wideband Code Division Multiple Access (WCDMA) CS speech services, the in-band signaling of AMR can be used for fast end-to-end signaling and the trigger to the adaptation is concluded from C/I measurements on the radio layer. For IP Multimedia Subsystem (IMS) Telephony however, this might be hard to achieve. First, there is no interface specified in the standards that allow an IMS Multimedia Telephony application to interface lower layers and second, the in-band signaling is currently only controlling the speech codec. Further, the CMR bits in the payload format are only allowed to control the speech codec mode although there are other possibilities for the client to adapt to a change in the transport characteristics (e.g. redundancy on/off, frame aggregation and so forth).

All-in-all, what is required is a media agnostic way of measuring channel degradation before it leads to severe quality problems. These measurements should be possible to perform without requiring access to lower layer information. However, if such access is present, the measurement domain would be even larger and the potential of quality benefit greater. This invention presents different embodiments with and without knowledge beyond measurements available on the transport layer such as the IP layer.

It is basically assumed that the transport channel displays jitter as a basic characteristic of the transmission. In networking, in particular IP networks, jitter normally refers to variations (statistical dispersion) in the end-to-end delay of the packets. Due to various factors such as network congestion, local transport conditions, or queuing issues, the delay between packets may vary instead of being constant. In other words, jitter may be seen as a variation in packet delivery timing to the communication endpoint. When the variations increase above some threshold, the consequences may be packet losses and/or reduced media (conversational) quality. Jitter is thus a basic parameter (available to the application from the transport layer (e.g. IP layer)) that can be used to detect and react to a possible forthcoming channel quality degradation that would otherwise result in an increased packet loss rate and/or reduced media quality.

The invention will now mainly be described with reference to wireless communication systems, such as High Speed Packet Access (HSPA), Long-Term Evolution (LTE) or Wireless Local Area Network (WLAN) systems, but the invention is not limited thereto. The invention may be applied in any real-time communication system where jitter is involved, including wireline systems.

For example, HSPA involves two access types; High Speed Downlink Packet Access (HSDPA) in the downlink and Enhanced Uplink (EUL) in the uplink. HSDPA is an enhancement to WCDMA that provides a smooth evolutionary path to higher data rates. HSDPA is specified in 3GPP release 5, and includes additional transport and control channels such as the High-Speed Downlink Shared Channel (HS-DSCH). EUL is specified in 3GPP release 6 and includes additional transport and control channels such as the Enhanced Dedicated Channel (E-DCH).

These links have an inherent property of jitter, i.e. variations in packet delivery timing to the IP endpoints. The reason for this jitter is basically two-fold:

First, there is a scheduler in the downlink which will schedule MAC-hs (Medium Access Control—high speed) transmission blocks according to some governing measurement resulting in a priority order. The length of the transmission buffer in NodeB will depend on the priority of the MAC-hs transmission blocks and the load in the cell.

Second, both HSDPA and EUL have fast lower layer re-transmission capabilities. Since the re-transmissions are fast, especially for HSDPA, the normal mode of operation does include re-transmissions in roughly 10% of the cases. By measuring the receival time of the IP packets on the application layer it can be seen that the delivery timing varies. It should be noted that this is a normal mode of operation and nothing unusual. In a sense this is an inherent feature of normal operation.

Both these two circumstances will introduce larger jitter if there is cell congestion, i.e. the scheduler in the downlink runs with a high load (resulting in long queues in NodeB), or if the local radio conditions of the receiving User Terminal (UE) forces NodeB to several re-transmissions. This means that the User Equipment (UE) will experience an increasing amount of jitter when the traffic situation degrades. When the buffer in the NodeB gets full or when the amount of re-transmissions increases above some threshold, packets will be dropped and the packet loss rate will increase.

If a variation in jitter characteristics (e.g. if the amplitude of the jitter increases or decreases) is detected in the UE this variation can be seen as a change of characteristics of the underlying channel, implying that the probability of a packet loss has increased or decreased. The UE can then act upon this input information and transmit a request to the sender to adapt the media characteristics used in the session. If the jitter decreases it can be seen as an improvement of the channel with reduced packet loss probability as a consequence. Reduced jitter is thus an indication that the UE can adapt upwards to a higher bit-rate and remove the bit-stream resilience measures.

After extensive experiments/simulations and careful analysis, the inventors have recognized that a jitter profile for a specific access technology and/or access parameter setting might be normal and should not trigger any adaptive action while the same jitter profile for another access technology and/or access parameter setting necessitates immediate adaptive actions. Hence, instead of evaluating jitter on a packet-by-packet basis, a jitter profile measured over a plurality of packets should preferably be evaluated. Furthermore, it is important that the measured jitter profile is put into the correct context when it is evaluated. To base an adaptation control algorithm solely on measured jitter (and packet loss rate) will provide a much too conservative control algorithm.

As illustrated in the exemplary flow diagram of FIG. 1, it is suggested to determine (S1) the characteristics of a jitter profile measured over a plurality of packets, and classify (S2) the jitter profile based on the determined characteristics as well as information representative of the particular access used for communication between the sender and the receiver. The classified jitter profile is then matched (S3) to an appropriate action for media layer adaptation so that the proper action can be initiated (S4).

By making the classification of the jitter profile not only based on the determined jitter characteristics but also based on information about the access used for the communication a much more informed media layer adaptation decision can be made, leading to considerable improvements of the utilization of available resources in the communication system.

In addition, the invention maintains the possibility to detect a forthcoming increase in packet loss rate in time, allowing the receiver to be proactive in order to optimize the session quality. This is also valid when trying to restore the session into its original intended quality, i.e. when doing upwards adaptation.

If a request for a reduction of coding bit-rate, packet rate or resilience measures is based on packet-loss statistics, the damage will already have been done on the media flow and the user will experience this as quality degradation even though the situation will improve after measures have been taken. In this invention, an increasing amount of jitter will trigger this reaction before the user experiences any quality degradation due to packet losses, even though some conversational quality degradation might occur due to longer end-to-end delay enforced by upwards jitter buffer adaptation. However, this degradation is present anyway and will provide much less apparent quality issues compared to the increase in packet loss rates.

Figure 2:
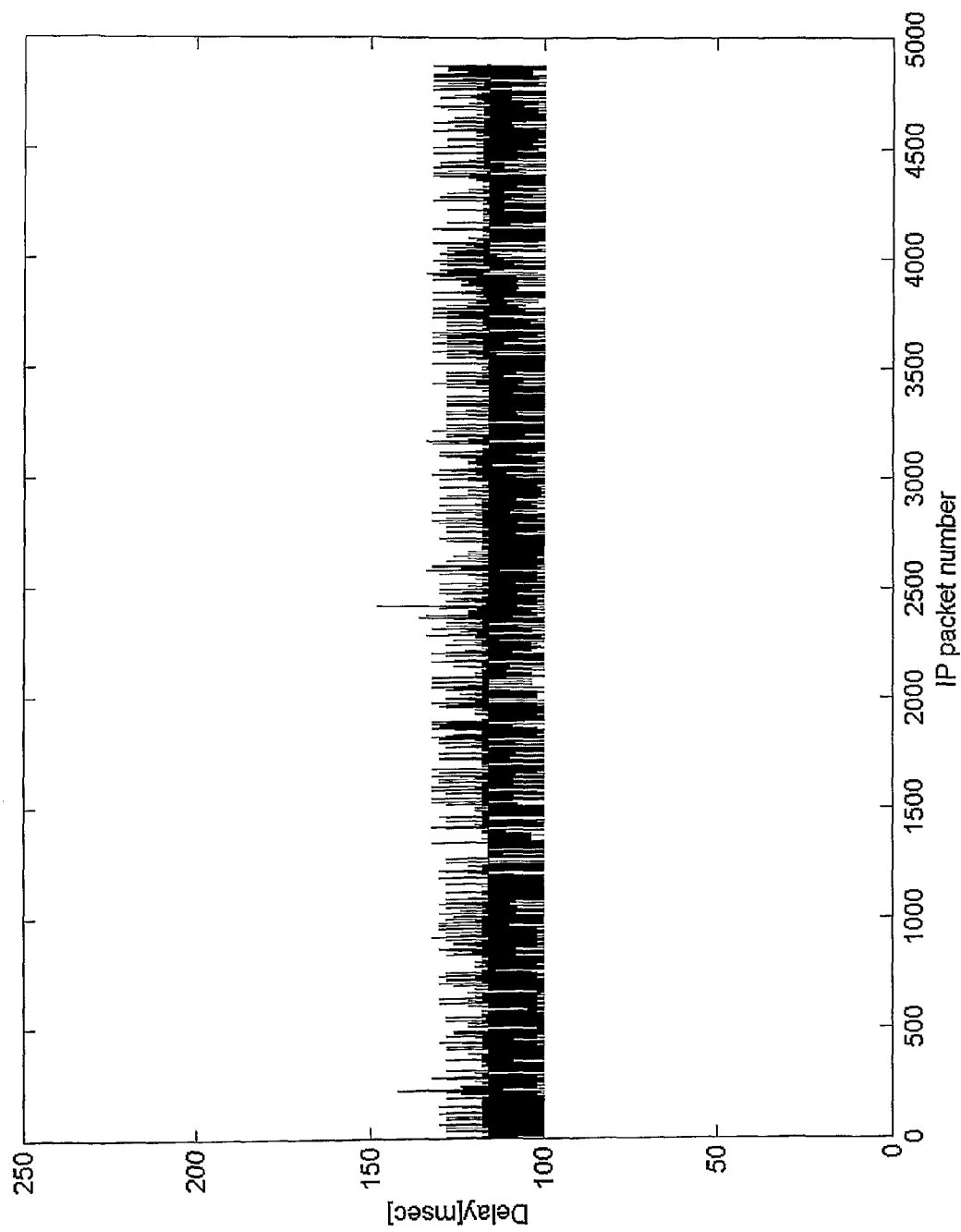
FIG. 2 is a schematic diagram showing an example of the end-to-end delay variation for speech.
Figure 3:
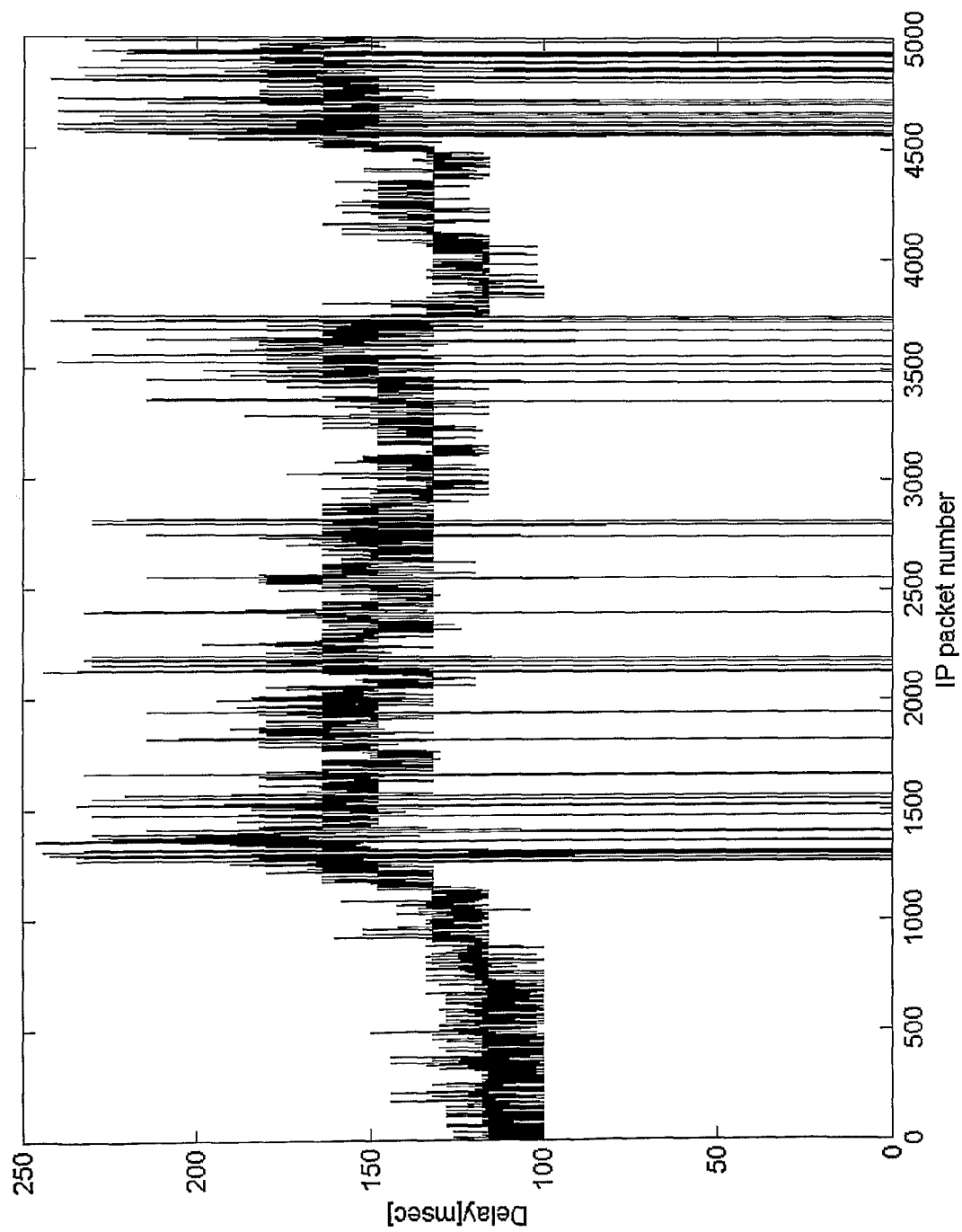
FIG. 3 is a schematic diagram showing another example of the end-to-end delay variation for speech.

For a better understanding of the invention, it may be useful to consider some jitter profiles in order to get some hands-on feeling. For example, the end-to-end delay variation (i.e. the jitter) of a typical HSPA channel is shown in FIG. 2. In particular, FIG. 2 illustrates an example of the delay variation for speech using E-DCH in the uplink with 2 ms Transmission Time Interval (TTI), packet-switched core network transport and HSDPA with a priority scheduler in the downlink. As can be seen, there is a typical baseline jitter which is always present under normal working conditions. However, if the re-transmissions increase or if the buffer in the NodeB becomes strained, the jitter will increase as will the fixed part of the end-to-end delay. This is illustrated in FIG. 3, which shows a more challenging jitter profile with higher packet loss rates. The drops down to zero indicate packet losses.

By monitoring jitter and packet loss (possibly other quality parameters) for various access configurations and estimating the correlation between the metrics a database can be assembled which reflects different access-dependent jitter behaviors to which different channel conditions and more importantly different media adaptation actions can be mapped. FIG. 4 illustrates the principles of database configuration according to an exemplary embodiment of the invention. The example database 100 shown in FIG. 4 includes a number of so-called access categories, a number of different types of jitter characteristics and corresponding media layer adaptation actions/measures. The access categories may for example be defined by access type and/or access parameter settings.

There are a number of different types of jitter, the characteristics of which will depend at least partly on the access configuration that is used for the communication. Preferably, the classification of a measured jitter profile starts by making a first level of classification based on the access information to reduce the number of different jitter types that have to be considered. Next, a second refined level of classification of the jitter profile is made, e.g. by comparison with a set of different predefined types of jitter profiles specific for the used access.

In the database, for each of a number of different access categories, a set of different predefined types of jitter profiles are stored together with information on corresponding actions for media layer adaptation. In response to information on the access category, a set of different predefined types of jitter profiles can thus be found in the database, and the determined jitter profile characteristics can then be compared with the corresponding characteristics of the access-specific types of jitter profiles to make a suitable classification.

Preferably, the jitter profile characteristics represent a time evolution of jitter over at least a subset of the packets of the measured profile. In practice, a jitter profile can be characterized by a set of representative key indicators or defining parameters, which may include parameters such as jitter amplitude evolution ("jitter derivative"), rate of jitter evolution, average jitter spike rate, average jitter spike amplitude, relationship to packet losses and so forth. A wide range of different key indicators may be envisaged.

It is desirable to use selected information on how the jitter evolves over a plurality of packets in order to predict whether the jitter is a natural part of the channel for the specific access used for the communication.

The various types of jitter may for example include spiky jitter characteristics, bursty jitter characteristics, and/or gradually changing jitter characteristics.

The adaptive action may for example include a change in source encoding rate combined with enhanced channel encoding, an error resilience measure for improved robustness combined with an offset, and/or frame aggregation or any other suitable resilience measure.

The information representative of the access used for the communication between the sender and the receiver is normally referred to as the access category or simply the access configuration, and may for example include information on the access type or technology and/or access parameter setting. In a wireless application this may for example be information on the wireless access type used and/or information on the radio bearer setting. For example, different radio access types, and different kinds of radio link realizations within a certain access type will exhibit different jitter characteristics. This information should be taken into account when evaluating jitter profiles and determining appropriate actions for media layer adaptation. The different kinds of radio link realizations are often referred to as QoS (Quality of Service) settings when different radio bearers (RAB) are considered.

FIG. 5 is a schematic diagram illustrating an example of a database configuration according to an exemplary embodiment of the invention. In this example, three different wireless access types are considered: WLAN, GSM and HSPA. When applicable, the radio bearer setting is also used for distinguishing between different access categories.

For example, for WLAN access type there may be a number of different predefined jitter profiles, with different characteristics quantified into a set of one or more key indicators. In this example, three different types of jitter profiles are defined by means of different intervals of a set of key indicators. Each type of jitter profile is matched in the database to a corresponding action. Hence, if WLAN access type is used and a given set of key indicators of a measured jitter profile lie in the respective intervals 0-50, 0-100 and 0-5 ms (for the sake of example), then the jitter will be classified as a specific type of jitter for which no action needs to be taken. However, on the other hand, if the key indicators lie in the respective exemplary intervals 50-75, 0-100, and 5-(i.e. over 5) ms, then we are dealing with another type of jitter that requires a media layer adaptation such as reduced packet size. Finally, if the key indicators lie in the respective exemplary intervals 75-, 100-, and 5-ms, then we have yet another type of jitter that requires a media layer adaptation action such as increased redundancy.

For GSM access type there may be different QoS settings, also referred to as radio bearers (RABs). In this example, for each radio bearer, there may be a number of different types of jitter profiles with corresponding actions for media layer adaptation. Similarly to the WLAN case, each predefined type of jitter profile is associated with a specific media layer adaptation action.

For HSPA access type there may also be different QoS settings or RABs, such as Radio Link Control-Unacknowledged Mode (RLC-UM) and Radio Link Control-Acknowledged Mode (RLC-AM). For example, for HSPA with RLC-UM, there are two different types of jitter profiles in this particular example of the database 100. Each profile is defined by a set of exemplary key indicator values, and associated with a corresponding action for adaptation. The action denoted "Normal" means that no adaptation is required.

A jitter profile measured on a specific radio bearer might be normal and should not trigger any adaptive action while the same jitter profile in another access technology, or radio bearer setting, will necessitate immediate adaptive actions. Hence, it is important that the measured jitter profile is put into the correct context when it is evaluated. This is done by considering information on the access configuration such as access technology/type and/or access parameter setting.

Figure 6:
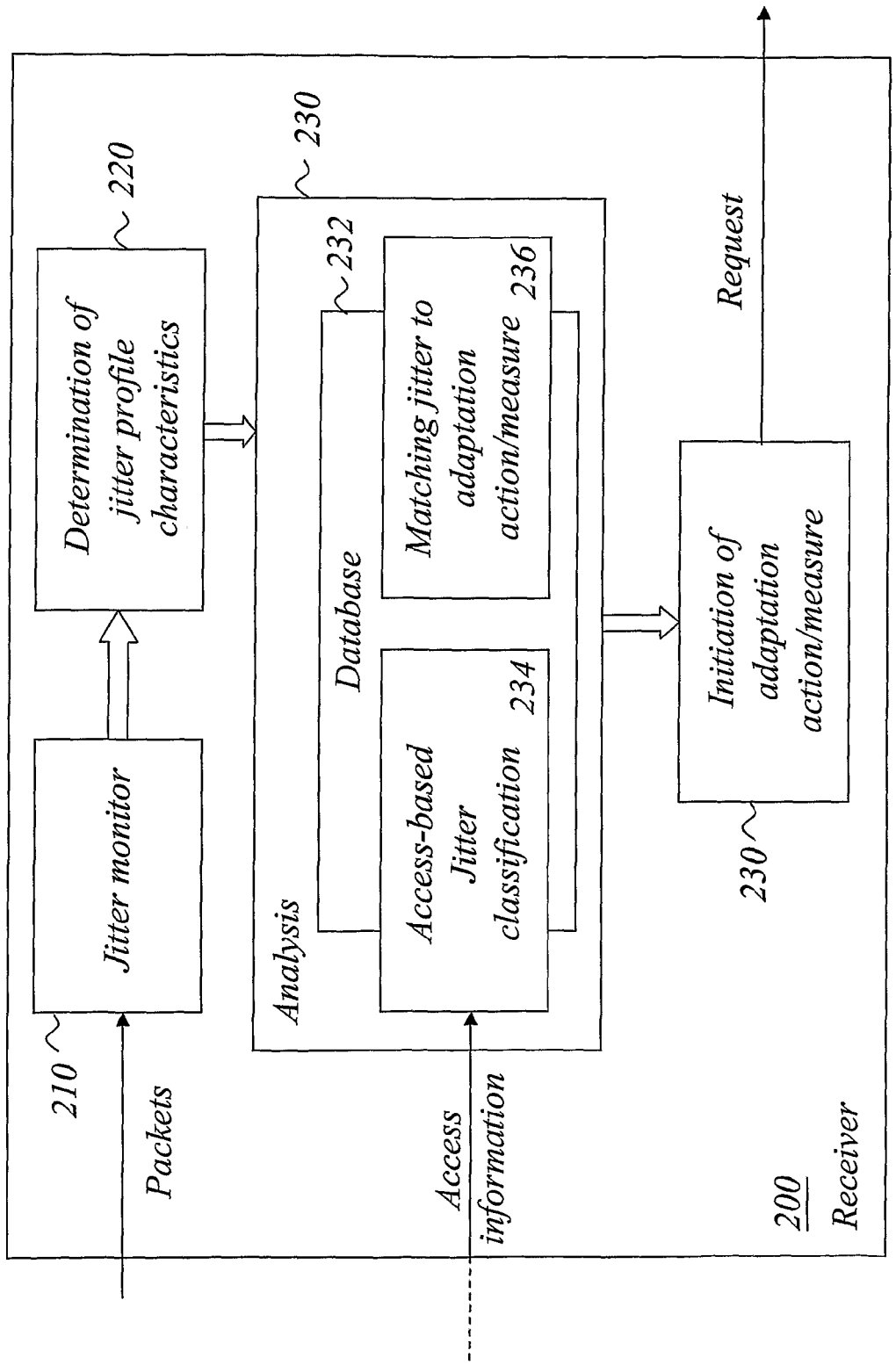
FIG. 6 is a schematic block diagram of a receiver according to an exemplary, preferred embodiment of the invention.

FIG. 6 is a schematic block diagram of a receiver according to an exemplary, preferred embodiment of the invention. Apart from conventional transceiver functionality, the receiver 200 further comprises a module 210 for measuring jitter, a module 220 for determination of jitter profile characteristics, an analysis module 230, as well as a module 240 for initiating the adaptation action. The jitter is measured in module 210 by any suitable conventional means. Suitable characteristics of a jitter profile measured over a plurality of received packets is determined in module 220. The jitter profile characteristics is then forwarded to the analysis module 230 for classification. The analysis module 230 is built around an appropriately configured database 232 together with associated modules 234, 236 for jitter classification and for matching the classified jitter to an appropriate adaptation action. The analysis module 230 also receives information about the access configuration used for the communication under consideration. In a wireless system, the mobile receiver normally requests resources from the network for communication. This may include radio access parameter settings such as RABs. The network then performs the actual resource allocation and may accept the requested settings from the mobile or modify them. The network sends information to the mobile on the allocated resources including information on the wireless/radio access to be used for communication. Information on the wireless access will thus be available at the mobile terminal, and can be used in the jitter profile classification. The receiver preferably initiates the adaptive action by sending a request to the sender informing the sender about the needed action or by at least providing the sender with the required information for initiating such action.

In a preferred exemplary embodiment of the invention, the evolution of the jitter amplitude is compared with different channel characteristics in the database 232. A classification function decides if the current channel characteristics necessitates adaptive actions, considering QoS attributes such as radio bearer type and/or radio access type. If such actions are deemed needed, a request is preferably transmitted to the sender, for example to reduce the source bit-rate, the source packet rate or to enforce some resilience measure making the bit-stream more robust towards packet loss and preferably remove the cause for the observed increase in delay jitter and reduce the risk for further channel degradation. This request can be transmitted either in-band by using payload specific fields in e.g. an RTP packet, or out-of-band using e.g. application specific report formats of RTCP. Alternatively, information on the jitter characteristics is sent to the sender for analysis and classification.

Figure 7:
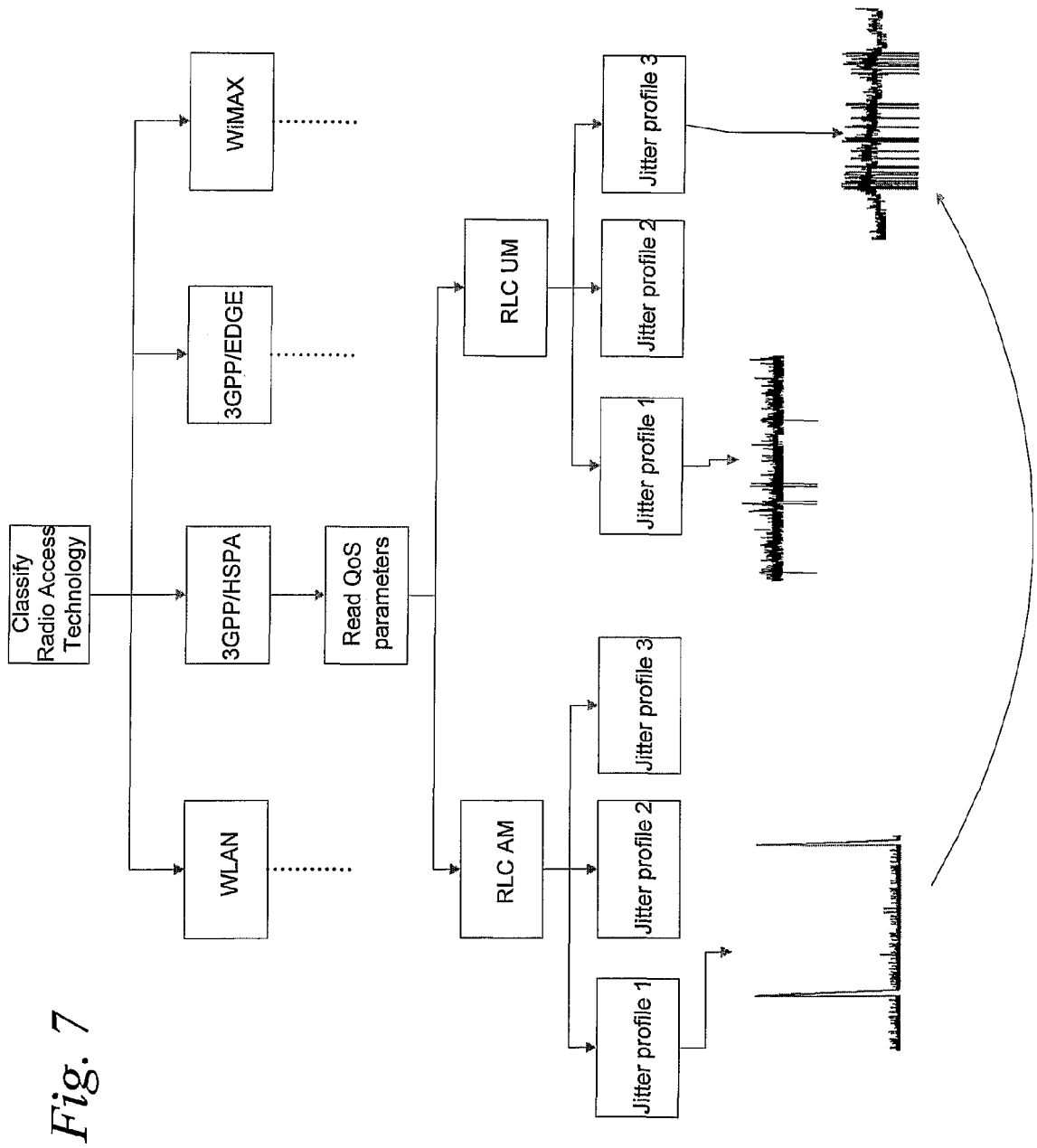
FIG. 7 is a schematic flow diagram illustrating an example of a classification process with more detailed focus on the 3GPP/HSPA access type.

FIG. 7 is a schematic flow diagram illustrating an example of a classification process with more detailed focus on the 3GPP/HSPA access type. In this example, the classification starts with radio access technology/type. In this case, the database is prepared with information for different access types including WLAN, 3GPP/HSPA, 3GPP/EDGE, and WiMAX. When it is concluded that the used access type is HSPA, the classification continues by reading the QoS parameters to determine which radio bearer setting that is used. In this example, there are two basic RABs, RLC UM and RLC AM, each with three different types of predefined jitter profiles.

An efficient radio bearer for real-time communication services is the RLC Unacknowledge Mode (RLC-UM), which only has re-transmissions on the MAC layer, not on the RLC layer. RLC Acknowledged Mode (RLC-AM) on the other hand, also has re-transmissions on the RLC layer which when occurring, will give a significant jitter increase of very short time duration. In this case, the jitter spike is normal and should be taken into account also in normal operating conditions and hence this behaviour should not indicate an immediate increase of packet loss probability. A similar jitter spike in RLC-UM on the other hand is much more likely to indicate forthcoming packet losses.

With reference to FIG. 7, for HSPA/RLC AM, when there is a normal baseline with high, but relatively infrequent jitter spikes in the order of say 200 to 400 ms, this may correspond to a first predefined jitter type (normal), which reflects a low risk for packet losses. Hence no adaptive action is required.

For HSPA/RLC UM, when there is a jitter profile with significant jitter increase (e.g. from 40 ms to 100 ms), but without jitter spikes, this may correspond to a third predefined jitter type, which reflects a high risk for packet losses. This means that adaptive actions are needed in order to avoid packet losses. It should be noted that the jitter amplitude for RLC AM sometimes go well beyond the jitter amplitude for RLC UM without requiring adaptive actions.

For comparison, please consider the first predefined jitter profile (normal) for RLC UM, which indicates a relatively low risk for packet losses.

In the following, a few examples of relationships between jitter and packet losses will be described. It is also described how this may impact the adaptation of for example bit rate, packet rate and other resilience measures.

Delay Scheduler and Unacknowledged Mode

The delay scheduler discards packets that are delayed a long time in the transmission queue. Long queuing delays can occur for several reasons:

1. Moving UEs with Varying Good and Poor Channel Conditions.

For good channel conditions, the jitter is probably small and packet losses are few. For bad channel conditions, multiple re-transmissions are required which gives long delays and probably also high packet loss rates. It can be expected that the transitions between good and poor channel conditions are fairly rapid as the UE moves in and out of the fading dips. The characteristics probably vary like:

a Period with small jitter and no packet losses.
b Short period with increasing jitter but no packet losses.
c Period with both large jitter and packet losses.
d Short period with decreasing jitter and no packet losses.
e Period with small jitter and no packet losses.

The process then repeats itself (more or less cyclically) from a.

It can be expected to encounter mainly single-packet losses because the scheduler will probably only transmit one RLC type Packet Data Unit (PDU) (=one packet=one speech frame) in each MAC-hs block.

2. High System Load but Good Channel Conditions.

In this case, it can be expected that the packet losses come in bursts since the scheduler will probably encapsulate several RLC PDUs (=packets=speech frames) into each MAC-hs transmission block. The reason why the losses come in bursts is because each user is scheduled relatively rarely (much less than the frame interval), which means that there will be several transmission blocks in the queue when the user is scheduled.

For the first case (1), the best adaptation measure is to reduce the size of the packets, e.g. the encoding bit rate, since this gives more room for channel coding of the MAC-hs transmission blocks. Frame aggregation is however not desirable since the main problem is the size of the transmission blocks. Error resilient measures may be useful, even though this maintains the size of the transmission blocks. The transition periods, especially b, may be long enough to allow triggering adaptation before the problems in period c are detected. This however probably depends on the speed of the UE.

For the second case (2), bit rate reduction works rather well. Frame aggregation will probably not give any considerable improvement. Redundancy will typically improve the quality when it is combined with an offset.

Combining the measures on the IP layer with additional knowledge from lower layers and previous statistics into a unified UE database will make it possible for the UE to request proper adaptive measures for the current channel behavior.

RAB with Acknowledge Mode

When the RAB uses acknowledge mode, there will be almost no packet losses at all, regardless of the amount of jitter. In this case, resilient measures are not applicable. The best adaptation measure is to reduce the size of the PDUs because there is then more room for channel coding of the MAC-hs transmission blocks.

If acknowledged mode (RLC AM) is used, there will be delay spikes in the order of 100-200 ms when RLC layer re-transmissions occur. In this case, error resilience adaptive measures will probably not be successful since the increase of jitter cannot be taken for granted to indicate forthcoming link packet losses. Reducing the bit-rate on the other hand will normally improve the situation since the required amount of transmission power will be reduced and more effort can be spent on lower layer channel coding.

Detection of delay spikes in combination with measured packet loss rate can serve as a classifier for RLC AM radio bearers and is then stored in the UE link characteristics database.

This is also an example when the knowledge of the QoS attribute (including the radio bearer type) will provide additional control to the adaptation control.

In a further aspect of the invention, it is possible to classify the jitter profile also based on information on which type of scheduler that is used in order to improve the performance.

For many wireless access types, such as HSPA, the scheduler in the downlink is proprietary, and the UE may need to adapt to the characteristics that the scheduler in the current system delivers. It should be noted that these characteristics can resemble the characteristics seen when a specific channel degrades, hence the normal state of the channel is often not static between different scheduler implementations. By monitoring the jitter characteristics and packet losses and estimate the correlation between the two metrics for different schedulers, a database can be assembled which also contains different scheduler behavior upon which a normal channel condition can be mapped. Hence, the criteria which will trigger adaptive measures can be changed over time and between different cells using different schedulers.

For example, with a round-robin scheduler, each user is scheduled every $N^{th}$ ms. The number N depends on how many users that are active. For low loads, N is less than the frame length and the scheduler will then transmit mainly single packets. When the load increases, N also increases and the scheduler starts packing two, three or more RLC PDUs in each MAC-hs block. This reduces the number of single losses and increases double, triple, etc packet losses. In this case, an exemplary appropriate adaptive measure is to reduce the encoding bit rate. Any error resilient measure should preferably be combined with an offset that is large enough to span the loss burst lengths for it to be effective.

In an exemplary embodiment of the invention, knowledge about scheduling behavior will be stored in the UE database and used to trigger proper adaptive actions.

In yet another aspect of the invention, the result and/or cost of the media layer adaptation action is evaluated and used for updating information in the database.

Typically, information on one or more of the predefined types of jitter profiles and/or information on action for media layer adaptation are updated in the database in response to the evaluation. The evaluation may consider a change in quality of the media packet flow with respect to packet loss, possibly in combination with a change in conversational quality. For example, it may be acceptable with a low to moderate level of packet loss in order to avoid high latency (conversational delay).

For example, the threshold(s) of adaptation may be adapted using previously measured actions for specific jitter behaviour. If an adaptive measure is taken, a quality evaluation (and optionally also an evaluation of the cost of the adaptation) is performed to estimate if the adaptive action improved the channel characteristics and the result is recorded in the database for different access configurations and/or scheduler behaviors together with the respective adaptive actions. The cost of adaptation may for example be estimated with respect to the amount resources spent on the adaptation. Hence, the performance of the mechanism may improve over time. It should be understood that the same principles can be used for any media using packet-switched transport including speech and video.

In general, when the performance is good (normal channel conditions) adaptation is avoided. Adaptation becomes more and more active as the operating conditions are deteriorating, but only for the UEs that benefit from the adaptation. This is further enhanced through the usage of the UE internal database of channel characteristics. In addition, it is advantageous to use only adaptation measures that provide an improvement. When it is possible to perform adaptation by several different means (bit rate reduction, packet rate reduction and/or resilience measures), it is beneficial to skip those means that do not give any improvement, which gives faster adaptation to the correct and useful means.

Figure 8:
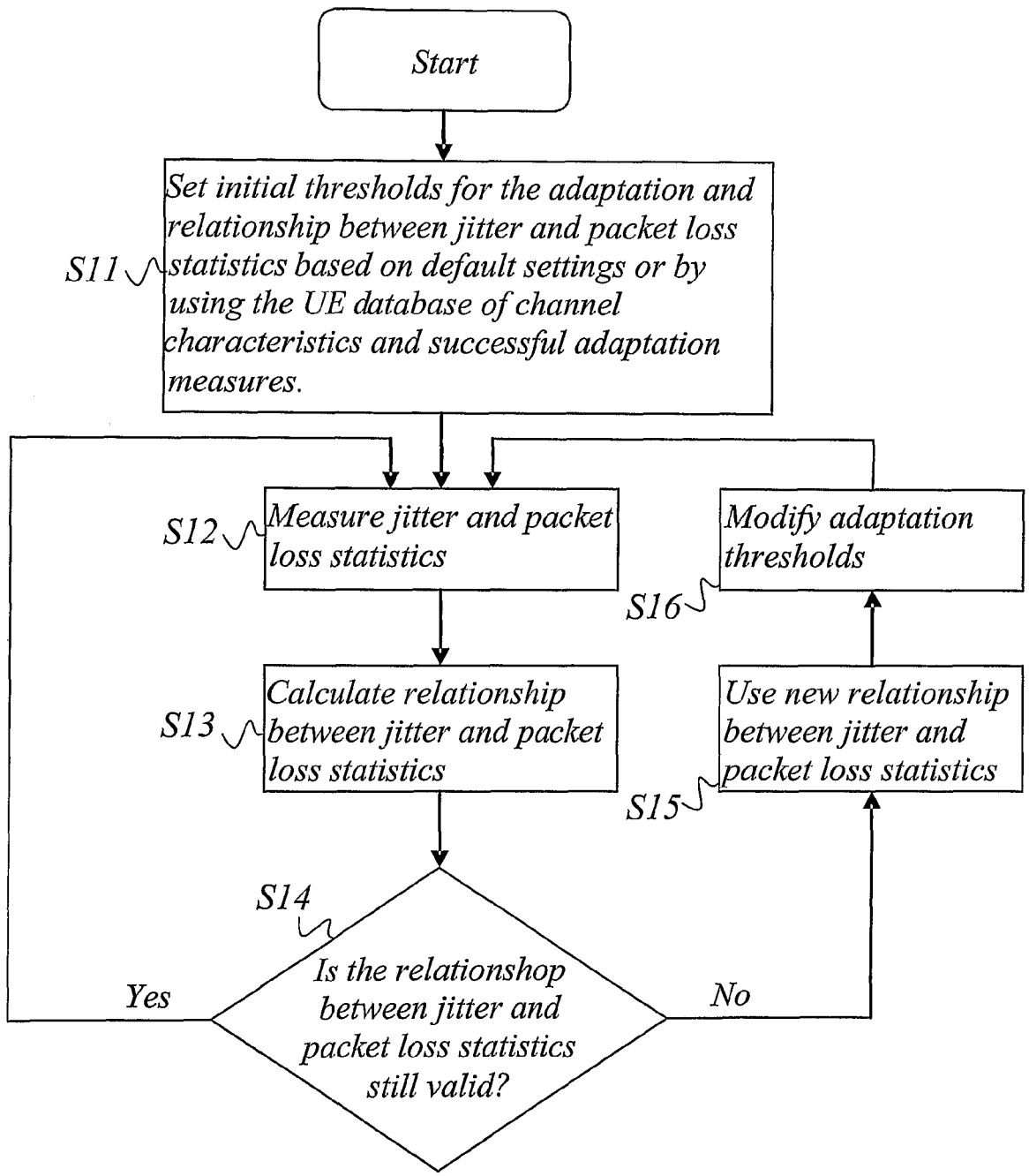
FIG. 8 is a schematic flow diagram for estimating the relationship between jitter and packet loss and for updating the database according to an exemplary embodiment of the invention.

FIG. 8 is a schematic optional flow diagram for estimating the relationship between jitter and packet loss and for updating the database according to an exemplary embodiment of the invention. The procedure is normally started by configuring initial thresholds for the adaptation and relationship between jitter and packet loss for various access configurations based on default settings, or by using the UE database of channel characteristics and successful adaptation measures (S11). Jitter and packet loss statistics (possibly combined with other quality parameters) are measured (S12), and a relationship between jitter and packet loss is calculated for each of a number of access configurations and possibly also scheduler behaviors (S13). If the relationship is deemed to be valid (S14, YES), the procedure simply continues to monitor jitter and packet loss. If not (S14, NO), a new relationship between jitter and packet loss will be used (S15), and adaptation thresholds may be modified accordingly (S16).

Figure 9:
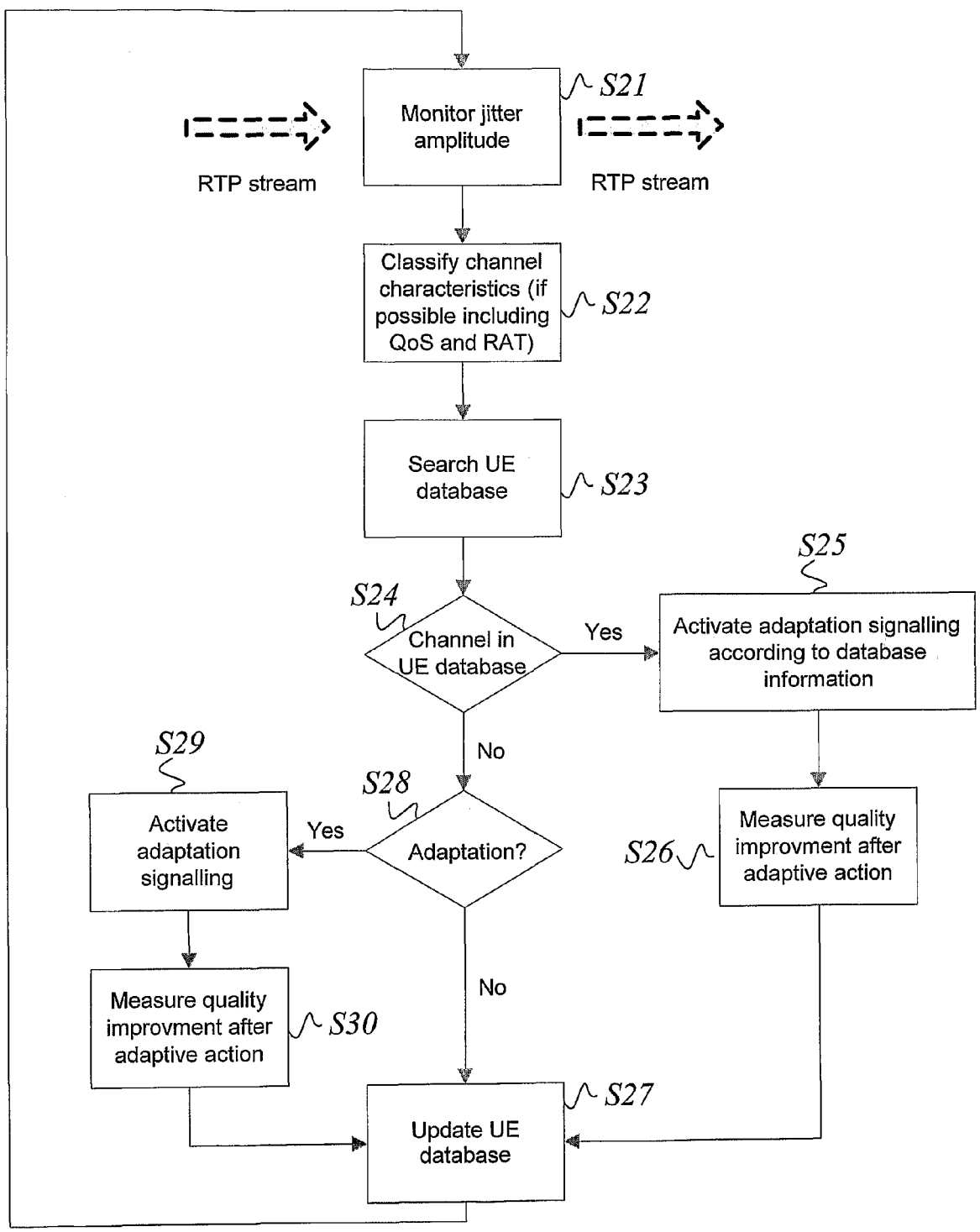
FIG. 9 is a schematic flow diagram for jitter classification, adaptation triggering and database processing according to an exemplary embodiment of the invention.

FIG. 9 is a schematic overall flow diagram for jitter classification, adaptation triggering and database processing according to an exemplary embodiment of the invention. In this particular example, a radio communication network using RTP is considered. Preferably the jitter amplitude of an RTP stream is monitored (S21). The jitter is analyzed, and the jitter-based channel characteristics is classified, considering radio access type and/or QoS settings (S22). The database is then searched to find a matching jitter profile (S22/S23). If the measured channel can be found in the database (S24, YES), a matching adaptation action is selected from the database and signalled to the sender.

Optionally, the quality improvement (packet loss and/or conversational quality) is measured after the adaptive action (S26) to enable proper update of the UE database (S27). If the measured channel can not be found in the database (S24, NO), it must normally be assessed whether adaptation is required by some other (conventional) means (S28). This is usually some rather rough and basic assessment, e.g. based on a simple threshold mechanism. If no adaptation is required (NO), the profile is stored in the database as a "normal" profile. If adaptation is required (YES), a suitable action is preferably selected and signalled to the sender (S29). The quality improvement (packet loss and/or conversational quality) can then be measured after the adaptive action (S30) to once again enable proper update of the UE database (S27).

Although the invention is mainly focused on wireless applications and systems, the invention is not limited thereto and may be applied in any real-time communication system, including wireline systems, where jitter is involved and information on access type and/or access parameter settings are known by or made available to the receiver side.

The embodiments described above are merely given as examples, and it should be understood that the present invention is not limited thereto. Further modifications, changes and improvements which retain the basic underlying principles disclosed and claimed herein are within the scope of the invention.

REFERENCES

[1] "*RTP: A Transport Protocol for Real-Time Applications*", RFC 3550, July 2003.
[2] "*Algorithm for audio packet loss prediction and avoidance based on jitter feedback*", Research Disclosure Database Number 429056, January 2000.

The invention claimed is:

1. A method for media layer adaptation in a real-time communication system having at least a sender and a receiver, said method comprising the steps of:
   determining on the receiver side, characteristics of a jitter profile measured over a plurality of packets sent in a media packet flow between said sender and said receiver, wherein said jitter profile characteristics includes information on how the jitter evolves over time;
   classifying the jitter profile based on the determined jitter profile characteristics and information representative of access used for communication between said sender and said receiver;
   wherein said classifying step comprises:
      making a first level of classification based on said information representative of access used; and
      making a second refined level of classification of the utter profile by comparing the litter profile with a set of different predefined types of jitter profiles specific for the used access;
   matching the classified jitter profile to an appropriate action for media layer adaptation; and
   initiating said action for adapting the media packet flow between said sender and said receiver.

2. The method of claim 1, wherein said step of classifying involves the use of a database comprising, for each of a number of different categories of accesses, a set of different predefined types of jitter profiles, each stored together with information on corresponding actions for media layer adaptation.

3. The method of claim 2, wherein each category of access is defined by a radio access configuration, including at least one of radio access type and radio access parameter settings.

4. The method of claim 2, wherein said step of classifying includes:
   finding, in response to said information on access used, a set of different predefined types of jitter profiles in said database; and
   comparing the determined jitter profile characteristics with the corresponding characteristics of the access-specific types of jitter profiles to make a suitable classification.

5. The method of claim 4, wherein, for at least one category of access, said set of different predefined types of jitter profiles includes at least one of the following: spiky jitter characteristics, bursty jitter characteristics and gradually changing jitter characteristics.

6. The method of claim 4, wherein said action is selected from at least one of the following: i) a change in source encoding rate combined with enhanced channel encoding, ii) an error resilience measure for improved robustness combined with an offset, and iii) frame aggregation.

7. The method of claim 4, further comprising the steps of evaluating the result of said media layer adaptation action, and updating, in response to the evaluation, information in the database.

8. The method of claim 7, wherein said updating step comprises the step of updating information on at least one of the different predefined types of jitter profiles and/or information on action for media layer adaptation in the database in response to the evaluation.

9. The method of claim 7, wherein said step of evaluating the result of said action includes evaluating a change in quality of said media packet flow with respect to packet loss.

10. The method of claim 7, wherein said step of evaluating the result of said action includes evaluating a change in quality with respect to packet loss together with a change in conversational quality.

11. The method of claim 1, wherein the determined jitter profile characteristics is represented by at least one defining jitter parameter value, and different predefined types of jitter profiles are defined by different intervals of said jitter parameter value.

12. The method of claim 1, wherein said step of classifying the jitter profile is also based on information on which type of scheduler that is used.

13. A device for supporting media layer adaptation in a real-time communication system, said device comprising: at least one processor; and at least one memory, said memory containing instructions executable by said processor whereby said device is operative to: determine characteristics of a jitter profile measured over a plurality of packets sent in a media packet flow between a sender and a receiver, wherein said jitter profile characteristics includes information on how the jitter evolves over time; classify the jitter profile based on the determined jitter profile characteristics and information representative of access used for communication between said sender and said receiver; wherein said classifying means includes: make a first level of classification based on said information representative of access used: and make a second refined level of classification of the jitter profile by comparing the jitter profile with a set of different predefined types of jitter profiles specific for the used access; match the classified jitter profile to an appropriate action for media layer adaptation;

and initiate said action for adapting the media packet flow between said sender and said receiver.

14. The device of claim 13, wherein said device is operative to cooperate with a database comprising, for each of a number of different categories of accesses, a set of different predefined types of jitter profiles, each stored together with information on corresponding actions for media layer adaptation.

15. The device of claim 14, wherein each category of access is defined by a radio access configuration including at least one of radio access type and radio access parameter settings.

16. The device of claim 14, wherein said device is operative to: find, in response to said information on access used, a set of different predefined types of jitter profiles in said database, and compare the determined jitter profile characteristics with corresponding characteristics of the access-specific types of jitter profiles to make a suitable classification.

17. The device of claim 14 the device further operative to: evaluate the result of said media layer adaptation action, and update, in response to the evaluation, information in the database.

18. The device of claim 17, wherein said device is further operative to update information on at least one of the different predefined types of jitter profiles and/or information on action for media layer adaptation in the database in response to the evaluation.

19. The device of claim 17, wherein said device is further operative to evaluate a change in quality of said media packet flow with respect to packet loss.

20. The device of claim 17, wherein said device is further operative to evaluate a change in quality with respect to packet loss together with a change in conversational quality.

21. The device of claim 13, wherein said device is further operative to request said action from said sender.

* * * * *

UNITED STATES PATENT AND TRADEMARK OFFICE
CERTIFICATE OF CORRECTION

PATENT NO. : 8,451,741 B2
APPLICATION NO. : 12/600084
DATED : May 28, 2013
INVENTOR(S) : Enström et al.

Page 1 of 1

It is certified that error appears in the above-identified patent and that said Letters Patent is hereby corrected as shown below:

On the Title Page, Item (12), under "United States Patent", in Column 1, Line 1, delete "Enstrom et al." and insert -- Enström et al. --, therefor.

On the Title Page, Item (75), under "Inventors", in Column 1, Line 1, delete "Daniel Enstrom," and insert -- Daniel Enström, --, therefor.

In the Drawings

In Fig. 9, Sheet 9 of 9, for Tag "S26", in Line 2, delete "improvment" and insert -- improvement --, therefor.

In the Specification

In Column 3, Line 8, delete "thereof;" and insert -- thereof, --, therefor.

In the Claims

In Column 12, Line 44, in Claim 1, delete "utter profile by comparing the litter" and insert -- jitter profile by comparing the jitter --, therefor.

In Column 12, Line 58, in Claim 3, delete "configuration," and insert -- configuration --, therefor.

Signed and Sealed this
Eighth Day of October, 2013

Teresa Stanek Rea
*Deputy Director of the United States Patent and Trademark Office*